Patented July 20, 1954

2,684,283

UNITED STATES PATENT OFFICE 2,684,283

METHOD OF RECOVERING DILUTE NITROGEN OXIDES FROM GASEOUS MIXTURES

Richard A. Ogg, Jr., Atherton, and James D. Ray, Palo Alto, Calif.

No Drawing. Application September 21, 1950, Serial No. 186,106

5 Claims. (Cl. 23—2)

The present invention relates to the recovery of nitrogen oxides in concentrated form from gaseous mixtures. In methods of manufacturing nitrogen oxides which involve the direct fixation of atmospheric nitrogen, such as the Wisconsin nitrogen fixation process or the electric arc process, the resultant nitrogen oxides are diluted in large quantities of nitrogen, oxygen, carbon dioxide, water vapor, etc., and usually amount to less than 3% by volume of the total mixture.

It is an object of this invention to provide an effective, fast-acting and economical method of recovering the nitrogen oxides in concentrated form from a mixture of the type referred to.

One of the methods employed to isolate the nitrogen oxides from such gaseous mixtures was to bring said gaseous mixtures into intimate contact with alkaline absorbents, usually hydroxides or carbonates, which are effective to absorb nitrogen oxides of a higher positive valence than nitric oxide from the mixture. By far the greater portion of the nitrogen oxides contained in the effluent combustion gases or an arc furnace, a Wisconsin nitrogen fixation furnace of the like exists in the form of nitric oxide (NO) which by itself does not react rapidly with alkaline absorbents. It has therefore been proposed to include in methods for the recovery of nitrogen oxides from gaseous mixtures of the type referred to, as a first step the oxidation of the nitric oxide contained therein with a view to converting at least one-half of said nitric oxide into nitrogen oxides of a higher positive valence. Such a separate oxidation process either requires cooling the gases and retaining them in an acid proof vessel for a period of time or necessitates contacting the gases with a catalyst of large mass, either of which may so increase the cost of the final product as to render the process economically impractical.

It is, therefore, an object of the present invention to provide a process for recovering nitrogen oxides in concentrated form from gaseous mixtures, of the type referred to, which does not require preliminary oxidation of the nitric oxide content of the gaseous mixture.

Another object is to provide a fast acting process for reacting nitric oxide and oxygen directly with alkaline absorbents without need to previously oxidize said nitric oxide, or even a portion thereof in a separate operation into oxides of a higher valence.

It is still another object to provide a process for recovering the nitrogen oxide component of a gaseous mixture, of the type referred to, which is effective to convert the nitric oxide contained in said gaseous mixture in a single operation into nitrogen salts without the necessity of interposing a separate nitric oxide oxidation process prior to contacting said gaseous mixture with an alkaline absorbent.

When the nitric oxide contained in the gaseous mixtures of the type referred to was oxidized in a separate process step, as was suggested prior to this invention, and the resultant mixture of residual nitric oxide and nitrogen oxides of a higher valance was brought into contact with alkaline absorbents, said mixture of nitrogen oxides reacted with the alkaline absorbents to form nitrites or a mixture of nitrites and nitrates.

In practice it is often desirable, however, to obtain only nitrates because nitrates may readily be converted into nitric acid, while it takes a more costly and complex process to convert nitrites into nitric acid. Also, while nitrates form a highly valued fertilizer, nitrites may actually be harmful to plants.

It is another important object of our invention, therefore, to provide a process which is effective to convert nitric oxide in a single operation and without a separate oxidation process, directly into nitrates to the practical exclusion of nitrites.

From the nitrates or nitrites formed in accordance with the invention the nitrogen oxides may readily be recovered in concentrated form by decomposition of said nitrogen salts—which decomposition may, for instance, be effected by subjecting said salts to elevated temperatures.

It is a further object of the invention to provide a nitrogen oxide recovery process of the type referred to wherein the substance initially employed to convert nitric oxide into nitrogen salts is automatically recovered in condition for re-use by decomposition of the nitrogen salts formed in accordance with the invention and may thus be continually re-employed to remove nitric oxide from the gaseous mixture.

We have discovered that the nitric oxide which forms a major portion of the nitrogen oxides contained in gaseous mixtures of the type referred to, may be converted directly and without previous separate oxidation of any part thereof, into nitrogen salts by conducting said gaseous mixture at certain elevated temperatures through a mass formed from an oxidation promoting catalyst and an alkaline absorbent which mass will hereinafter be referred to as "oxsorbent" for reasons of simplicity. In this operation the nitric oxide and oxygen contained in the gaseous mixture react directly and rapidly with the "oxsorbent" to form nitrogen salts. From the resultant mass the nitrogen oxides may readily be liberated and recovered in concentrated form by subjecting said mass to still higher temperatures than those at which the nitric oxide and oxygen were reacted with the "oxsorbent" and the residual mass may then again be employed as "oxsorbent" so that the same amount of "oxsorbent" may be continually re-used to remove nitric oxide from the gas mixture. In the preferred embodiment of our invention we are able not only to convert nitric oxide directly and rapidly into nitrogen salts without previous oxidation in a separate process, but by proper choice of the catalyst, the alkaline absorbent and the operating temperature we are able to obtain a product that contains only nitrates to the practical exclusion of nitrites.

In selecting the constituents of an "oxsorbent" in accordance with the invention it is important that only such oxidation promoting catalysts and such alkaline absorbents be used together as have coincident or overlapping effective temperature ranges. Care should also be taken that only such constituents be used as have no excessive fluxing effect upon one another at the temperatures of operation since a fluxed or glazed "oxsorbent" will have lost most or all of its effectiveness. If for some reason it is desirable, however, to use constituents that do have a fluxing or liquifying affect upon one another, the resultant "oxsorbent" should be supported upon a suitable carrier in such a manner as to present a large area to the gaseous mixture, in order to preserve its absorptivity.

A preferred "oxsorbent" is prepared by heating under agitation 2 moles of sodium nitrate ($NaNO_3$) and 1.1 moles of ferric oxide ($Fe_2O_3$) at a temperature within the range of from 700° C. to 900° C. until the nitrogen oxides are largely dispelled and the $N_2O_5$ content of the residue is only about 10% by weight. The resultant mixture contains 1 mole of sodium oxide and 1.1 mole of ferric oxide. The mole ratio of the ingredients is not critical however and may be varied from at least 1:1 to 1:2.4. In referring to the "oxsorbent" as a "mixture" we do not wish to convey that the constituents of the "oxsorbent," such as, for instance, the sodium oxide and the ferric oxide referred to above, are necessarily present in the form of physical mixture. While they may indeed exist in the form of a physical mixture, it is also possible that they may at least in part have entered into chemical combinations. Therefore, whenever the "oxsorbent" of the invention is hereinafter referred to as a "mixture" or a "mass" in the specification and in the claims these terms should be understood to mean either a physical mixture or a chemical combination, or both. When nitric oxide is contacted with the above described "oxsorbent" in the presence of free oxygen within the temperature range from 300° C. to 500° C., and preferably 400° C., the nitric oxide is rapidly converted into nitrate with only traces of nitrite in the resultant product.

We are unable to explain with certainty the chemical mechanism through which the described method converts the nitric oxide into nitrate. As regards the rapid and direct conversion of nitric oxide into nitrogen salts, it is possible that by the concurrent use of an oxidation promoting catalyst and an alkaline absorbent in intimate mixture at temperatures within the range effective for catalysis and absorption, the newly formed nitrogen oxides of higher valence react with the alkaline absorbent as fast as they are formed and are therefore continually removed from the gas phase with extreme rapidity so that in spite of the low equilibrium value of certain ones of the nitrogen oxides of higher valence said equilibrium value is never reached, thereby enabling rapid conversion of nitric oxide into nitrogen salts through a momentary intermediate state wherein the nitric oxide is converted into a nitrogen oxide of higher valence. In other words, by the concurrent use of an oxidation promoting catalyst and an alkaline absorbent in intimate mixture at a temperature within the range effective for catalysis and absorption the oxidizing and absorbing reactions are telescoped with the result that the first mentioned reaction proceeds essentially to completion which it could not do alone and which it can only do by virtue of the continuous rapid removal of the nitrogen oxides of higher valence.

In an exemplary embodiment of the invention a gaseous mixture of the type referred to containing 0.7% of nitric oxide was contacted with 7.8 grams of an "oxsorbent" composed of sodium oxide and ferric oxide and prepared in the manner hereinbefore described except that the ratio of sodium oxide to ferric oxide was 1:1. The gaseous mixture was conducted through the "oxsorbent" at a superficial velocity of 0.46 feet per second (measured at 60° F. and at a pressure of 1 atmosphere) for a period of 135 minutes. The area of the "oxsorbent" mass normal to the flow of gas was of such value as to allow passage of 0.160 cubic feet of the mixture per minute and the temperature was held within the range of from 330° C. to 440° C. After 135 minutes the weight of the mass of "oxsorbent" had increased by 45.5% and an analysis of said increased mass showed its composition to be 50.1% of ferric oxide, 46.1% of sodium nitrate and only 0.28% of sodium nitrite, the balance being made up of various impurities. Said mass may either be used directly as a fertilizer or may be leeched with water to separate the nitrate from the ferric oxide. In the preferred embodiment of the invention, however, the nitrogen oxides were recovered in concentrated form from said mass by subjecting it to temperatures of the order of 700° C. The residual mass was found to be effective as "oxsorbent" in the spirit of the present invention so that the same substance could continually be re-used to recover nitric oxide from the gaseous mixture.

The rate at which the nitric oxide is adsorbed from the gaseous mixture in accordance with the invention is strongly temperature dependent and doubles for approximately each 30° C. rise in temperature in the temperature range from 330° C. to 440° C.

Another example may serve to illustrate how completely and rapidly nitric oxide may be removed from gaseous mixtures, of the type referred to, by the process of the present invention when carried out at the proper temperature. In this second example a gaseous mixture containing 1.9% of nitric oxide was conducted through 25 grams of the same "oxsorbent" as described in the first example and at the same velocity and at the same flow rate. Contact between the gaseous mixture and the "oxsorbent" was arranged to occur in a fluidized bed of average depth of about 4". The degree to which the nitric oxide was removed from the gaseous mixture is best illustrated by the following table:

| Time in Minutes | Temperature | Percent of NO removed from the gas stream | Total Weight gain of "Oxsorbent," percent |
|---|---|---|---|
| 5 | 465 | 57.9 | 2.2 |
| 5 | 460 | 84.9 | 5.4 |
| 5 | 453 | 99.2 | 9.2 |
| 10 | 468 | 85.9 | 15.7 |
| 15 | 460 | 92.1 | 19.6 |

The transit time of the gaseous mixture through the "oxsorbent" was calculated to be only about 1/6 of a second yet, after an introductory period of about 10 minutes the nitric oxide content of the gaseous mixture was removed from said mixture at efficiencies as high as 99%, as demonstrated by the above table.

In two other practical examples the "oxsorbents" were prepared respectively from cobalt oxide and calcium nitrate and from nickel oxide and calcium nitrate, the molar ratio of calcium oxide to transition metal oxide in the final product being about 1:1. These "oxsorbents" proved effective in the sense described above, their temperature ranges for absorption and regeneration respectively being similar in magnitude to those for the "oxsorbent" composed of sodium oxide and ferric oxide.

While we have employed calcium oxide and sodium oxide as alkaline adsorbents in the above given examples it will be understood that oxides of other alkali or alkaline earth metals may be used successfully in the spirit of our invention. Also while we have explained the process of our invention with particular reference to the recovery of the nitrogen oxides produced by processes which involve the direct fixation of atmospheric nitrogen, it will be understood that the utility of our process is not limited to gaseous mixtures of the type named but it may readily be adapted for use in the recovery of nitrogen oxides from other gaseous mixtures such as those resulting from the ammonia oxidation process.

We claim:

1. The method of converting nitric oxide directly into a sodium nitrate which comprises contacting the nitric oxide in the presence of free oxygen with a mass of ferric oxide and sodium oxide containing at least one mole of ferric oxide for every mole of sodium oxide, at temperatures within the range of from 300° C. to 500° C.

2. The method of removing nitric oxide from a gaseous oxygen containing mixture, which comprises passing the gaseous mixture through a mass containing ferric oxide and sodium oxide, at a temperature of the order of from 300° C. to 500° C.

3. The method of converting nitric oxide directly and in a single operation into sodium nitrate to the practical exclusion of nitrites, which comprises contacting the nitric oxide in the presence of free oxygen concurrently with ferric oxide and sodium oxide at a temperature within the range of from 300° C. to 500° C.

4. The method of converting nitric oxide in a single operation into a nitrogen salt which comprises contacting the nitric oxide in the presence of free oxygen with a mass of an oxidizing catalyst in the form of an oxide selected from the group: ferric oxide, nickel oxide, cobalt oxide, and an alkaline adsorbent of the group: alkali and alkaline earth metal oxides at a temperature within the range of from 300° C. to 500° C.

5. The method of removing nitric oxide from a gaseous oxygen-containing mixture which comprises passing the gaseous mixture through a mass containing an oxidizing catalyst in the form of an oxide selected from the group: ferric oxide, nickel oxide, cobalt oxide, and an alkaline adsorbent of the group: alkali and alkaline earth metal oxides at a temperature within the range of from 300° C. to 500° C.

References Cited in the file of this patent

UNITED STATES PATENTS

| Number | Name | Date |
|---|---|---|
| 763,941 | Keler | June 28, 1904 |
| 921,975 | Glaser | May 18, 1909 |
| 1,115,164 | Bosch et al. | Oct. 27, 1914 |
| 1,207,706 | Bosch | Dec. 12, 1916 |
| 1,798,533 | Henglein | Mar. 31, 1931 |
| 2,041,504 | Weston | May 19, 1936 |
| 2,115,173 | Klingelhoefer | Apr. 26, 1938 |
| 2,419,255 | Dely | Apr. 22, 1947 |
| 2,503,963 | Mosesman | Apr. 11, 1950 |

FOREIGN PATENTS

| Number | Country | Date |
|---|---|---|
| 145,824 | Great Britain | June 25, 1920 |
| 327,047 | Great Britain | Mar. 27, 1930 |

OTHER REFERENCES

"Catalysis," Berkman, Morrell, Egloff, 1940, Reinhold Publishing Co., N. Y., pages 656–659.